Oct. 1, 1968     B. QUINTON     3,403,590
INSTRUCTION FINGERBOARD FOR STRING INSTRUMENTS
Filed July 19, 1965     3 Sheets-Sheet 1
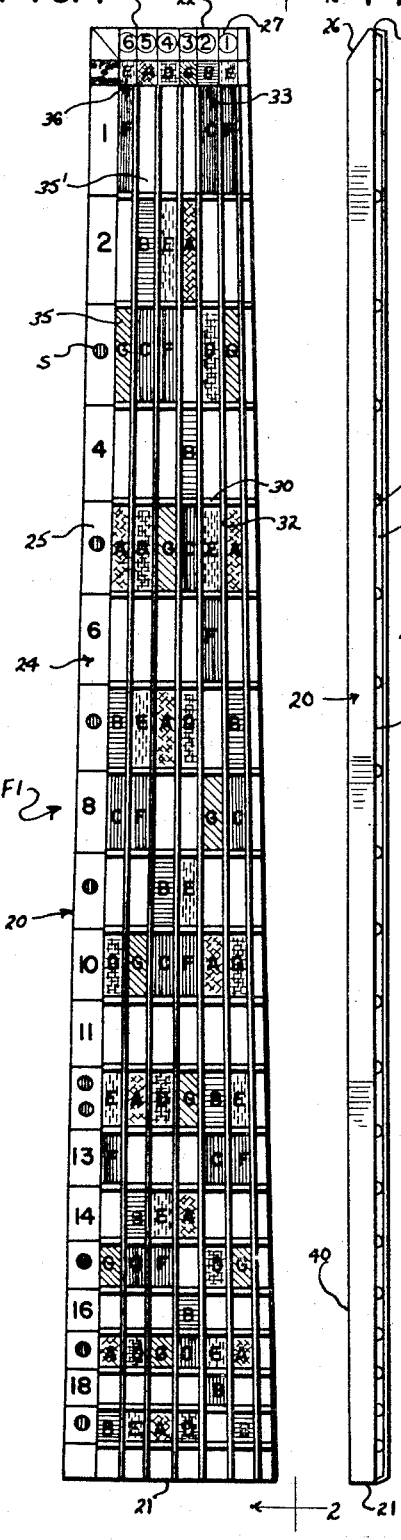
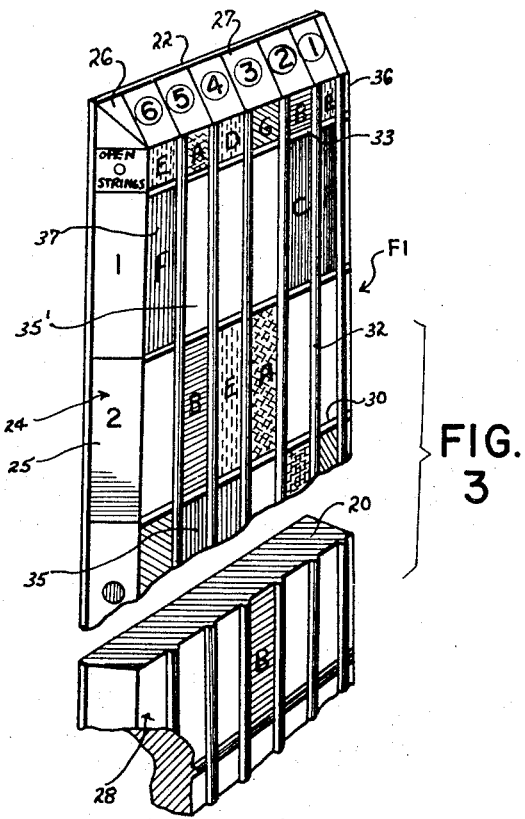
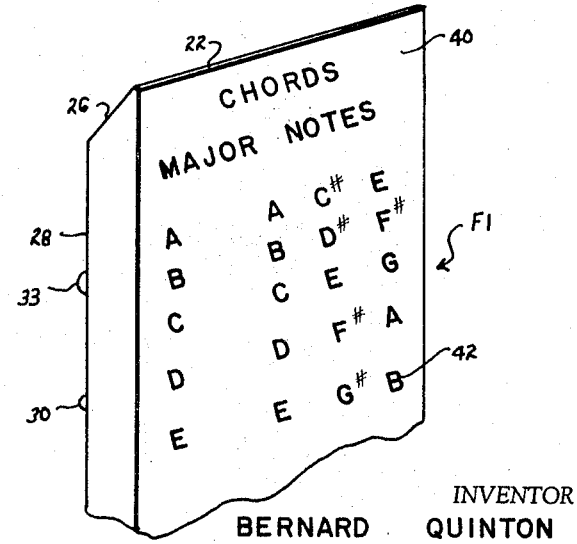
INVENTOR
BERNARD QUINTON
BY Polachek & Saulsbury
ATTORNEYS Oct. 1, 1968 B. QUINTON 3,403,590
INSTRUCTION FINGERBOARD FOR STRING INSTRUMENTS
Filed July 19, 1965 3 Sheets-Sheet 2
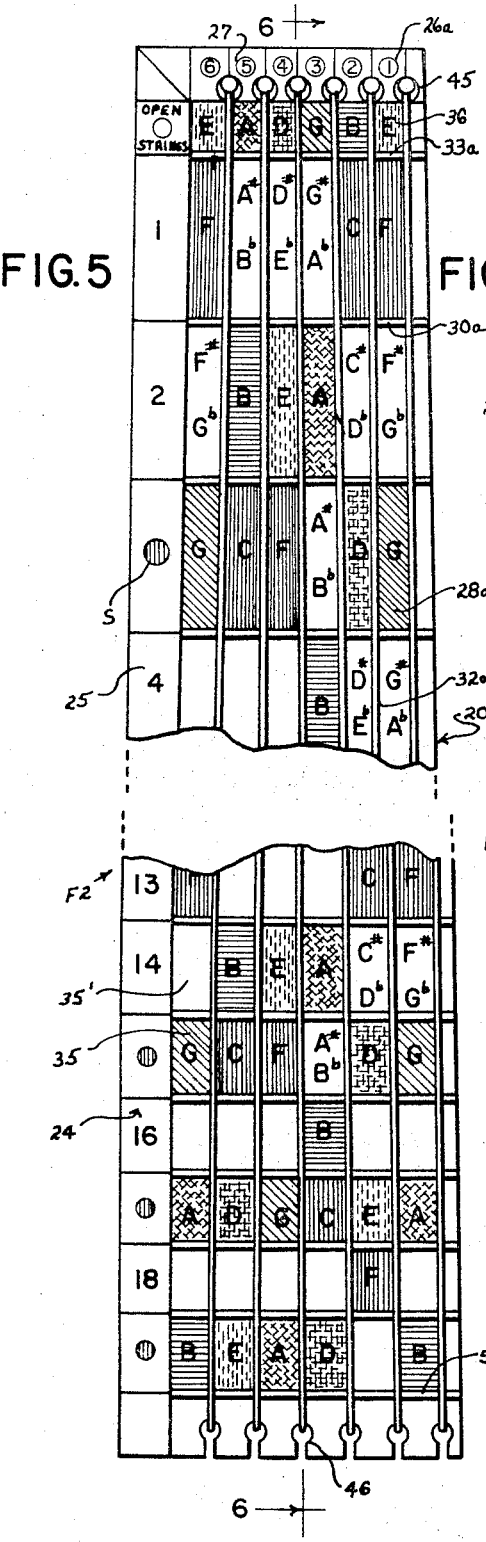
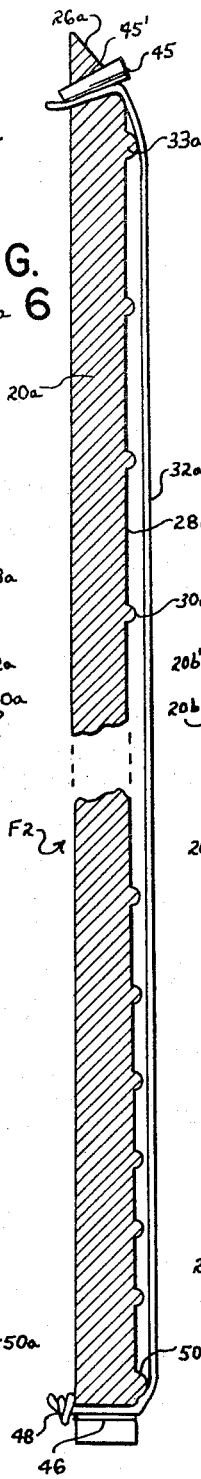
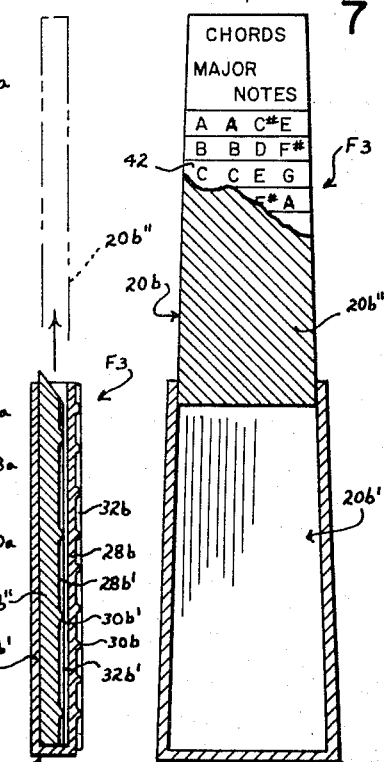
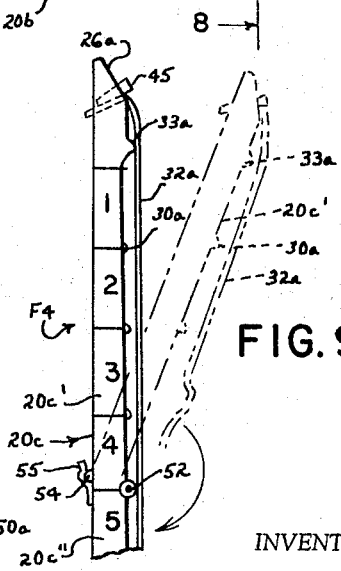
INVENTOR
BERNARD QUINTON
BY Polachek & Saulsbury
ATTORNEYS

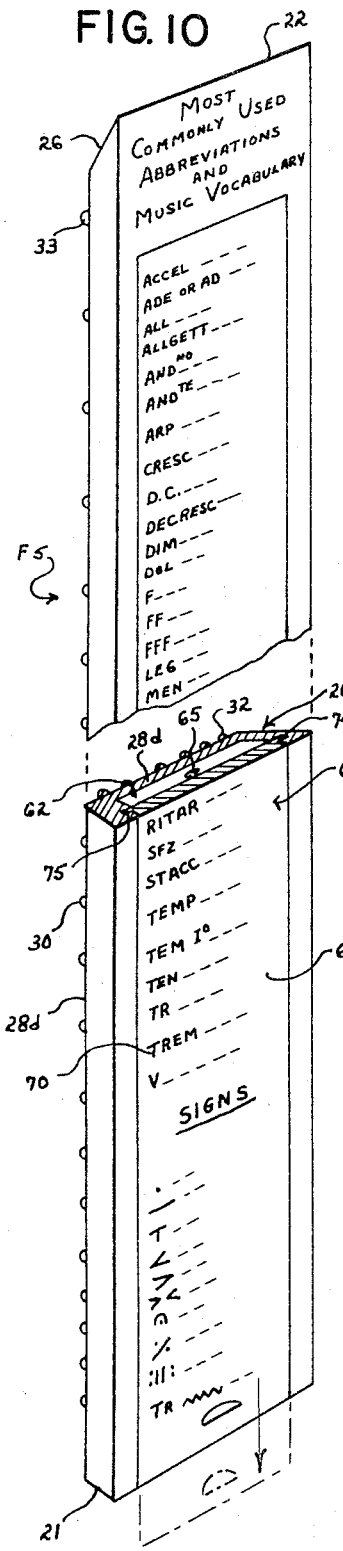
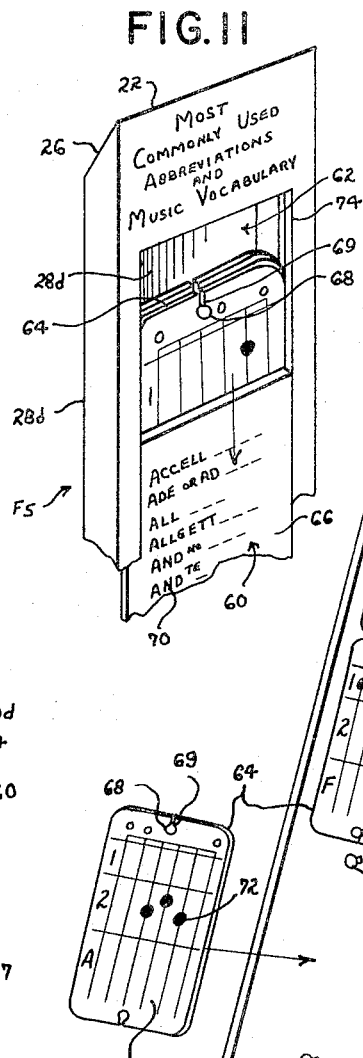
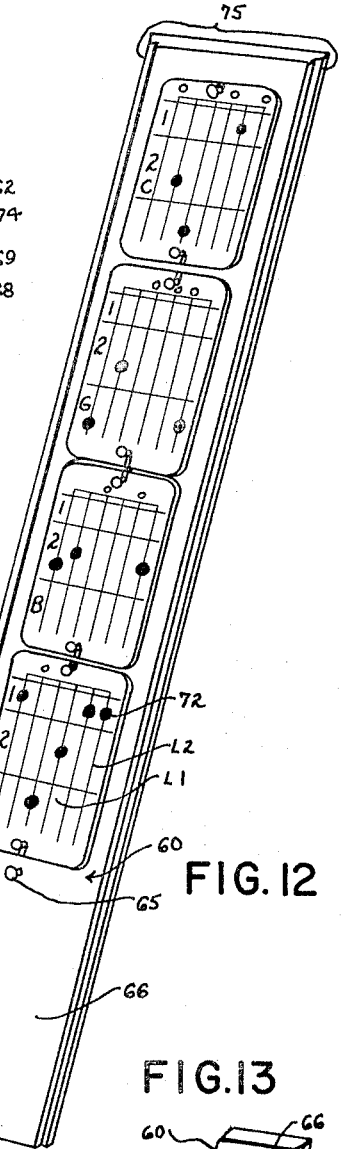
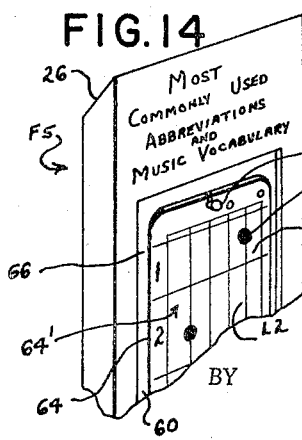

United States Patent Office 3,403,590
Patented Oct. 1, 1968

3,403,590
INSTRUCTION FINGERBOARD FOR
STRING INSTRUMENTS
Bernard Quinton, 40 Tucker Ave.,
Tuckahoe, N.Y. 10707
Filed July 19, 1965, Ser. No. 473,140
4 Claims. (Cl. 84—470)

ABSTRACT OF THE DISCLOSURE

A practice fingerboard for simulating playing of a stringed instrument having simulated frets and strings for silent finger practice. The fingerboard comprises an elongated flat body tapering in width with integral transverse ridges simulating frets and being spaced apart longitudinally of the side of the body progressively smaller distances from the top to bottom. A plurality of longitudinally extending transversely spaced ridges extend outwardly of one side of the body and intersect the first named integral transverse ridges. The longitudinally extending ridges simulate musical strings. The intersecting ridges define rectangular areas having different colors representing chromatic notes.

---

This invention concerns a practice fingerboard useful in learning to play a fretted stringed musical instrument such as a guitar, banjo, mandolin and the like with respect to the number of strings.

According to the invention, the fingerboard has a rigid wood, metal or plastic body with integral spaced transverse ridges simulating frets and longitudinal spaced ridges simulating strings. Spaces between the frets and strings are marked with letters identifying notes of the fingerboard. The several spaces can be differently colored, all spaces representing notes of the same letter or key being colored the same. The fingerboard can be used for silent practice in which the user's hand and fingers assume correct positions for playing chords. On the back of the fingerboard may be provided a chart of chords or other music information for ready reference. In another form of the invention, the fingerboard is provided with nonmusical elastic strings supported in a manner similar to the strings on a stringed instrument. The strings can be manipulated in a manner simulating the playing of a stringed instrument for silent practice purposes. In a further form of the invention the fingerboard may have a compartment in which are contained chord charts removably mounted on a sliding panel. The panel and charts can be removed for reference purposes. The fingerboard can also have a collapsible construction.

It is therefore one object of the invention to provide a practice fingerboard with simulated frets and strings for silent finger practice.

A further object is to provide a practice fingerboard with simulated frets integral with the fingerboard and with elastic, nonsounding strings extending over the frets to simulate a fingerboard of a stringed instrument.

Another object is to provide a practice fingerboard as described, wherein the fingerboard is formed of two hinged or mutually sliding parts to facilitate collapsing the fingerboard.

Other objects are to provide a practice fingerboard having simulated frets and simulated musical strings disposed perpendicularly to each other, with colored spaces therebetween identifying notes on the fingerboard.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a front elevational view of a practice fingerboard embodying the invention.

FIG. 2 is a side elevational view taken on line 2—2 of FIG. 1.

FIG. 3 is an enlarged fragmentary perspective view of the parts of the fingerboard of FIG. 1.

FIG. 4 is a fragmentary rear perspective view of the fingerboard.

FIG. 5 is a front elevational view of another fingerboard according to the invention.

FIG. 6 is a longitudinal sectional view taken on line 6—6 of FIG. 5.

FIG. 7 is a sectional view of another fingerboard in extended position.

FIG. 8 is a longitudinal sectional view of the fingerboard of FIG. 7, taken on line 8—8 of FIG. 7, but shown in collapsed position.

FIG. 9 is a fragmentary side elevational view of a further fingerboard.

FIG. 10 is a rear perspective view of still another fingerboard, with a closed rear panel.

FIG. 11 is a fragmentary rear perspective view of the fingerboard of FIG. 10 with panel partially removed.

FIG. 12 is a perspective view of the panel employed in the fingerboard of FIGS. 10 and 11 with chord charts mounted on the panel.

FIG. 13 is an exploded fragmentary perspective view of parts of a chord chart and a mounting panel.

FIG. 14 is a fragmentary rear perspective view of the fingerboard of FIGS. 10 and 11, with panel shown in reversed position and chord charts exposed.

Referring first to FIGS. 1–4, there is shown a practice fingerboard F1. This fingerboard has a flat, generally rectangular rigid body 20 which tapers from its wider lower end 21 up to its narrower upper end 22. The body 20 has a beveled left edge 24 as viewed in FIGS. 1 and 3. This edge is divided into rectangular areas 25 of progressively shorter length and bears numbers "1" through "18" indicating fret positions of the fingerboard. Omitted numbers are replaced by spots S representing octaves. The upper edge 26 of the body 20 is beveled and is divided into six rectangular areas 27 with numbers "1" through "6" representing strings of the fingerboard.

On the front side 28 of the fingerboard are integrally formed transverse ridges 30 simulating frets. The ridges 30 are spaced progressively shorter distances apart from the bottom to top edges of the fingerboard. Further integrally formed ridges 32 extend longitudinally of the front side 28 and intersect ridges 30 to simulate strings of a musical instrument such as a six-stringed guitar. Uppermost transverse ridges 33 project further out than the others and simulates the nut of a fingerboard. Rectangular areas 35 are defined between the intersecting ridges 30 and 32. These areas are differently colored. Areas 35' representing sharps and flats are uncolored. All other areas representing chromatic naturals are colored and all naturals of the same letter are identically colored. The color scheme illustrated in the drawing is as follows: A-orange; B-blue; C-pink; D-yellow; E-purple; F-red; G-green. If desired, any other color scheme can be adopted. Just above the long rectangular areas 35 are short rectangular areas 36 colored according to the color scheme of the fingerboard and bearing the letters: E, A, D, G, B, E, respectively, representing the names of the six strings of the fingerboard. It will be noted that each of the areas 35 bear letters 37 representing the chromatic notes of the fingerboard. Only the areas 35 representing the naturals are shown colored as above mentioned, but if desired the areas 35' representing sharps and flats of the naturals can be colored the same as the naturals but in different tints. This arrangement facilitates recognition of the note locations of the fingerboard.

All areas 35, 35' correspond to fret positions on those strings immediately to the right of the areas 35, 35' as viewed in FIGS. 1 and 3. This arrangement permits the user to place the fingers of his left hand on the simulated strings between the simulated frets while the corresponding areas 35, 35' remain visible to him.

On the flat rear side 40 of the fingerboard is a chart 42 listing chords and notes constituting the chords, for ready reference by the user of the fingerboard in practicing playing of the chords on the simulated strings and frets.

FIGS. 5 and 6 show another practice fingerboard F2 which is generally similar to fingerboard F1 and corresponding parts are identically numbered. On the front side 28a of the fingerboard, the transverse ridges 30a simulating frets and larger upper ridge 33a representing the nut are integrally formed with rigid body 20a of the fingerboard. A plurality of elastic strings 32a which may be made of any suitable material and need not be vibratory musical strings, are strung between pins or pegs 45 at upper beveled edge 26a and the bottom end of the fingerboard. The pegs are held removably in holes 45' in edge 26a. The strings extend throuugh slots 46 formed in the bottom end of the fingerboard and terminate in knots 48 at the rear side 40a. The strings are spaced away from the ridges 30a since they pass over the larger or higher ridge 33a at the top and another high ridge 50a at the bottom. Bottom ridge 50a simulates the bridge of a stringed instrument.

The areas 35 and 36 are colored according to the same color scheme as fingerboard F1. In use of this fingerboard the user manipulates the strings to simulate the actual playing of an actual instrument. The nonmusical strings are silent; nevertheless they offer resistance to finger pressure which simulates that of musical strings in a stringed instrument.

In FIGS. 7 and 8 is shown a collapsible fingerboard F3 which has a body 20b with laterally tapered lower flat hollow body section 20b'. This section has an open top. In this body section is slidably disposed a rigid laterally tapered body section 20b''. On the front side 28b of body section 20b' and on the front side 28b' of section 20b'', are transverse ridges 30b, 30b' simulating frets and longitudinal ridges 32b, 32b' simulating strings. The ridges are integrally formed with the body sections in the same manner as illustrated for fingerboard F1. The section 20b' can be extended to the position of FIG. 7 for use in fingerboard practice. When the section 20b'' is collapsed or retracted into body section 20b' the fingerboard occupies minimum space for convenient storage and transportation. Other parts corresponding to fingerboard F1 are identically numbered.

Fingerboard F4 shown in FIG. 9 is similar to fingerboard F2 and corresponding parts are identically numbered. In fingerboard F4 the tapered body 20c has a upper section 20c' and a lower section 20c'' pivotally secured together by a hinge 52 at the front so that the fingerboard can be collapsed to minimum size. A projection 54 is provided at the rear side of upper section 20c'' on which engages a spring catch 55 supported on and attached to the upper end of lower section 20c''. This catch holds the fingerboard sections in extended position while permitting ready folding of the sections as indicated by dotted lines in FIG. 9.

In FIGS. 10–14 is shown another fingerboard F5 which has ridges 30, 32, and 33 on its front side 28d identically to those of fingerboard F1. This fingerboard has a hollow body 20d with an open rear side closed by a sliding panel 60. A narrow compartment 62 is defined between panel 60 and the front side wall 28d of the fingerboard body. A plurality of rectangular cards 64 bearing colored chord charts 64' are stored in compartment 62. These cards may be mounted on knobs 65 extending outwardly of the inner or front side 66 of panel 60. Holes 68 with radial slots 69 are formed in the top and bottom marginal edges of the charts to receive the knobs as clearly shown in FIG. 13. On the rear flat side 67 of panel 60 may be provided other useful musical information such as a brief musical dictionary 70.

Each of the charts 64' is preferably colored to correspond with the color scheme of the fingerboard. An A-chart will be colored orange; a B-chart will be colored blue, etc. On each chart are inscribed transverse lines L1 and longitudinal lines L2 representing frets and strings respectively of the fingerboard. Notes 72 of the chord corresponding to the key signature of the chord are indicated on the lines L2. Open strings are indicated by O just above lines L2.

Selected cards 64 can be mounted on the outside of the panel which may be reversed in position in the body 20d as shown in FIG. 14. Side walls of the body 20d have grooves 74 which receive ridges 75 formed at lateral edges of panel 60 to facilitate holding the panel in position and to permit reversing the panel in position at the back of the fingerboard body.

In all forms of the invention, silent practice of finger positions on the fingerboard is facilitated. Since the fingerboards closely simulate fingerboards of actual instruments, the users will quickly gain facility in fingering the strings and in learning the chords.

The fingerboards can be made of any rigid material such as wood, metal or plastic and can be produced at low cost. They are durable in construction and will provide long, useful service.

What is claimed is:

1. A practice fingerboard for simulating playing of a stringed instrument, comprising a rigid flat elongated body tapering in width from end to end thereof, a plurality of transverse first ridges simulating frets integrally formed with one side of said body, disposed throughout its length, and spaced apart longitudinally of said one side progressively smaller distances from top to bottom of said body, the uppermost and lowermost ones of said ridges extending outwardly of said one side of said body to simulate a nut and bridge respectively of said instrument, a plurality of nonmusical strings, and means extending said strings in tension over said uppermost and lowermost ridges so that the strings are normally spaced away from the other transverse ridges.

2. A practice fingerboard for simulating playing of a stringed instrument, comprising a rigid flat elongated body tapering in width from end to end thereof, a plurality of transverse first ridges simulating frets integrally formed with one side of said body, disposed throughout its length, and spaced apart longitudinally of said one side progressively smaller distances from top to bottom of said body, the uppermost and lowermost ones of said ridges extending outwardly of said one side of said body to simulate a nut and bridge respectively of said instrument, a plurality of nonmusical strings, and means extending said strings in tension over said uppermost and lowermost ridges so that the strings are normally spaced away from the other transverse ridges, said one side of said body having rectangular areas defined between said ridges and the intersecting strings, said areas being colored to represent chromatic notes.

3. A practice fingerboard for simulating playing of a stringed instrument, comprising a rigid flat elongated body tapering in width from end to end thereof, a plurality of transverse first ridges simulating frets integrally formed with one side of said body, disposed throughout its length, and spaced apart longitudinally of said one side progressively smaller distances from top to bottom of said body, the uppermost and lowermost ones of said ridges extending outwardly of said one side of said body to simulate a nut and bridge respectively of said instrument, a plurality of nonmusical strings, and means extending said strings in tension over said uppermost and lowermost ridges so that the strings are normally spaced away from the other transverse ridges, said one side of said body having rectangular areas defined between said ridges and intersecting strings, said areas being colored to represent chromatic notes, said body having a beveled lateral edge numbered to indicate numbered frets and a beveled upper edge numbered to indicate numbered strings.

4. A practice fingerboard for simulating playing of a stringed instrument, comprising a rigid flat elongated body tapering in width from end to end thereof, a plurality of transverse first ridges simulating frets integrally formed with one side of said body, disposed throughout its length, and spaced apart longitudinally of said one side progressively smaller distances from top to bottom of said body, the uppermost and lowermost ones of said ridges extending outwardly of said one side of said body to simulate a nut and bridge respectively of said instrument, a plurality of nonmusical strings, and means extending said strings in tension over said uppermost and lowermost ridges so that the strings are normally spaced away from the other transverse ridges, said body being hollow and having an open back, a panel slidably and reversibly mounted in the open back of said body, said body having a compartment defined between said panel and said one side, cards having chord charts therein stored in said compartment, and means on said panel for supporting said cards on said panel while the panel is in a reversed position and supported at the back of said body.

References Cited

UNITED STATES PATENTS

| | | | |
|---|---|---|---|
| 3,218,904 | 11/1965 | Hartman | 84—485 |
| 1,751,048 | 3/1930 | Miessner | 84—485 |
| 2,814,231 | 11/1957 | Jones | 84—485 |

RICHARD B. WILKINSON, *Primary Examiner.*

G. M. POLUMBUS, *Assistant Examiner.*